(12) United States Patent
Roston et al.

(10) Patent No.: US 10,118,115 B2
(45) Date of Patent: *Nov. 6, 2018

(54) CENTRIPETAL SEPARATION SYSTEM FOR CLEANING PARTICULATE-PERVADED AIR OR GAS

(71) Applicant: ANDOVER PROTECTION SYSTEMS, LLC, Brooklyn, NY (US)

(72) Inventors: Edward Roston, Brooklyn, NY (US); Andrew W. Lynch, Brooklyn, NY (US); Johnathan B. Wetjen, Brooklyn, NY (US)

(73) Assignee: ANDOVER PROTECTION SYSTEMS, LLC, Brooklyn, NY (US)

( * ) Notice: Subject to any disclaimer, the term of this patent is extended or adjusted under 35 U.S.C. 154(b) by 215 days.

This patent is subject to a terminal disclaimer.

(21) Appl. No.: 15/019,507

(22) Filed: Feb. 9, 2016

(65) Prior Publication Data
US 2016/0158680 A1    Jun. 9, 2016

Related U.S. Application Data

(63) Continuation of application No. 14/077,196, filed on Nov. 11, 2013, now Pat. No. 9,259,675.

(51) Int. Cl.
*B01D 45/00*   (2006.01)
*B01D 45/14*   (2006.01)
(Continued)

(52) U.S. Cl.
CPC ............. *B01D 45/14* (2013.01); *B01D 45/16* (2013.01); *B01D 17/0217* (2013.01);
(Continued)

(58) Field of Classification Search
CPC ........ B01D 45/14; B01D 45/16; F01M 13/04; F01M 2013/0422; B04B 2005/125
See application file for complete search history.

(56) References Cited

U.S. PATENT DOCUMENTS

| 1,785,918 A | 12/1930 | Stebbins |
| 2,209,607 A | 7/1940 | Nutting |

(Continued)

FOREIGN PATENT DOCUMENTS

| DE | 102008012402 | 9/2009 |
| EP | 1204450 B1 | 4/2005 |
| WO | WO9740915 | 11/1997 |

OTHER PUBLICATIONS

International Search Report and Written Opinion for PCT/US2014/064660, dated Feb. 23, 2015, 13 pages.
(Continued)

*Primary Examiner* — Dung H Bui
(74) *Attorney, Agent, or Firm* — Ansari Katiraei LLP; Arman Katiraei; Sadiq Ansari

(57) ABSTRACT

Some embodiments provide a centripetal air or gas cleaning apparatus for removing particulates from air or gas. The apparatus comprises an inlet, housing, impeller, a clean air outlet, and a particulate outlet. The housing has an inner conical surface. The impeller's rotation creates negative pressure towards the inlet that intakes particulate-pervaded air or gas into the housing. The rotation also induces an accelerating force that throws the particulate-pervaded air or gas against the outer walls of the housing. Here, the particulates separate from the air or gas, penetrate a high-pressure zone, and are ejected through the particulate outlet located in the high-pressure zone. The air or gas, having less inertia, deflects away from the high-pressure zone where it is then subjected to a centripetal force that drives the air or gas towards the center of the housing behind the impeller where it is ejected through the clean air outlet.

16 Claims, 7 Drawing Sheets

(51) Int. Cl.
  *B01D 45/16* (2006.01)
  *B04B 5/12* (2006.01)
  *F01M 13/04* (2006.01)
  *B01D 17/02* (2006.01)
  *B07B 7/083* (2006.01)
  *B07B 7/01* (2006.01)
  *B04C 9/00* (2006.01)

(52) U.S. Cl.
  CPC ........... *B04B 2005/125* (2013.01); *B04C 9/00* (2013.01); *B07B 7/01* (2013.01); *B07B 7/083* (2013.01); *F01M 13/04* (2013.01); *F01M 2013/0422* (2013.01)

(56) References Cited

U.S. PATENT DOCUMENTS

| | | |
|---|---|---|
| 2,593,294 A | 4/1952 | Goldberg |
| 2,780,309 A | 2/1957 | Loftheim |
| 4,279,743 A | 7/1981 | Miller |
| 6,110,246 A | 8/2000 | Eubank |
| 6,372,006 B1* | 4/2002 | Pregenzer ............ A61C 17/046 210/188 |
| 7,022,163 B2* | 4/2006 | Olsson ................... B01D 45/14 95/268 |
| 7,249,468 B2 | 7/2007 | Roston |
| 7,749,310 B2 | 7/2010 | Lagerstedt et al. |
| 8,353,665 B1 | 1/2013 | Stockstill et al. |
| 8,357,232 B1* | 1/2013 | Morrison ............... B01D 53/24 55/404 |
| 2003/0085158 A1 | 5/2003 | Oirschot |
| 2003/0221996 A1 | 12/2003 | Svoronos et al. |
| 2006/0096933 A1* | 5/2006 | Maier ................... B01D 45/14 210/787 |
| 2006/0196154 A1* | 9/2006 | Benedictus ........... A47L 9/1608 55/337 |
| 2008/0308480 A1 | 12/2008 | Lagerstedt et al. |
| 2012/0010063 A1 | 1/2012 | Levitt et al. |

OTHER PUBLICATIONS

Extended European Search Report for European Application 14861087.6 andPCT/US2014/064660, dated May 29, 2017, 10 pages.

* cited by examiner

CENTRIPETAL SEPARATION SYSTEM FOR CLEANING PARTICULATE-PERVADED AIR OR GAS

CLAIM OF BENEFIT TO RELATED APPLICATIONS

This application is a continuation of the U.S. non-provisional application Ser. No. 14/077,196, entitled "Centripetal Separation System for Cleaning Particulate-Pervaded Air or Gas", filed Nov. 11, 2013. The contents of application Ser. No. 14/077,196 are hereby incorporated by reference.

TECHNICAL FIELD

The present invention relates to a filtration apparatus that ejects particulates from air or gas.

BACKGROUND ART

In many industrial and commercial applications, motorized machinery is subjected to environmental hazards and harsh operating conditions that expedite or otherwise induce mechanical failure or sub-optimal operation of the machinery. Air or gas that is pervaded with particulates is one such hazard. The particulates can include coal dust, saw dust, metal dust, dirt, sand, and liquid contaminants as some examples. When the air and the accompanying particulates enter into the motor housings or other mechanical parts of the machinery, the particulates can disrupt or interfere with the normal operation of the machinery, and thus cause the failure or sub-optimal operation. The particulates can also be harmful to humans breathing in the particulate-pervaded air.

Air or gas cleaning systems have existed for many years. Some operate with permeable barriers that entrap the unwanted particulates while permitting the cleansed air or gas to pass through. They inherently create an initial pressure drop, creating a restriction to the airflow, which worsens over time as the media entraps the unwanted particles, further reducing performance, and causing wear and tear on machine components. Moreover, these air or gas cleaning systems are expensive to operate and to maintain as the barrier entrapping the particulates must be continually cleaned or replaced. Other systems operate by manipulating airflow in various ways to induce the separation of the particulates from the air. The vast majority of these separation systems have an intrinsic downfall in that the particulates must be collected, emptied, and disposed of. Thus, there remains a need for newer filtration systems that more effectively supply clean air or gas from a source of particulate-pervaded air or gas while doing so more reliably, economically, and effectively for prolonged periods in industrial and other applications without the necessity that the particulate be collected.

SUMMARY OF THE INVENTION

Some embodiments provide a centripetal air or gas cleaning system and apparatus. The apparatus intakes particulate-pervaded air or gas and induces centripetal forces to cause the particulates to separate and be expelled from a different outlet than that of the cleansed air or gas. The apparatus comprises an inlet, housing, impeller, and at least one clean air outlet and one particulate outlet.

The inlet provides an opening through which the apparatus intakes particulate-pervaded air or gas. In some embodiments, the inlet extends centrally from a proximal end of the housing. The inlet may be an opening at the proximal end of the housing. Alternatively, the proximal end of the housing may include a ring that curves into the inlet in order to join the two. The housing extends conically away from the inlet to the housing's distal end. The angle of the extension varies depending on the desired application.

The housing provides a radially collapsing volume that increases pressure for air or gas circulating therein. In some embodiments, a channel or set of channels run along the housing to make a discrete barrier to isolate particulates that have been successfully expelled from the path of clean air. The radially collapsing volume within the housing is produced in part by an inner conical surface. The conical surface is comprised of a curved plane that approaches and intersects the housing's distal end from within. Specifically, the conical surface has a first edge that forms within the distal end of the housing, wherein the diameter of the first edge matches approximately to that of the housing distal end. The curved plane then extends inwards within the housing from this first edge at an acute angle to a second edge that is located about centrally within the housing. The angle can vary from more than 0 to less than 90 degrees in different embodiments, such that the diameter of the conical surface gradually decreases from the first edge to the second edge. A shallower angle may improve particulate separation, though the optimal angle depends on the particulate being separated. Some embodiments allow for the adjustment of the angle at which the conical surface protrudes within the housing.

The second edge, which is the innermost protruding edge of the conical surface, contains an opening at its center that serves as the clean air outlet. The particulate outlet is an opening that is adjacent to the first edge or base of the conical surface. In some embodiments, the conical surface also provides a mount to which the impeller can be coupled.

When in operation, a motor causes the impeller to rotate. This rotation creates negative pressure that pulls in the particulate-pervaded air or gas from the inlet into the housing. The rotation also creates an initial accelerating force that throws the particulate-pervaded air or gas towards the housing's walls. The particulate-pervaded air or gas then decelerates due to shearing forces from the housing walls and a zone of increasingly high-pressure is formed by the collapsing volume. The particulates, because of their greater momentum, penetrate through the high-pressure zone. The particulates higher mass moment of inertia allows them to move radially outward through the pressure gradients and down along the sides of the conical surface until they are ejected through one of the particulate outlets. The air or gas, having less inertia, is deflected away from the high-pressure zone and a centripetal force drives the air or gas back towards the center axis and behind the impeller. This causes an increase in angular acceleration and facilitates a final stage of centrifugal filtration as remaining particulates are spun outward and the cleansed air or gas continues through the clean air outlet.

BRIEF DESCRIPTION OF THE DRAWINGS

In order to achieve a better understanding of the nature of the present invention, a preferred embodiment for the centripetal air or gas cleaning system and apparatus will now be described, by way of example only, with reference to the accompanying drawings in which.

DETAILED DESCRIPTION

In the following detailed description, numerous details, examples, and embodiments for the centripetal air or gas cleaning system and apparatus are set forth and described. It will be clear and apparent to one skilled in the art that these systems and apparatuses are not limited to the embodiments set forth and that the systems and apparatuses may be practiced without some of the specific details and examples discussed.

Provided is a centripetal air or gas cleaning system and apparatus that removes particulates from air or gas. The particulates can include any solid state matter that is intermixed with the air or gas resulting in an undesired contamination of the air or gas. Coal dust, saw dust, metal dust, dirt, and sand are some examples of particulates that the system and apparatus is designed to remove from air or gas. The particulates can additionally or alternatively include liquids suspended in the air or gas.

Figure 1:
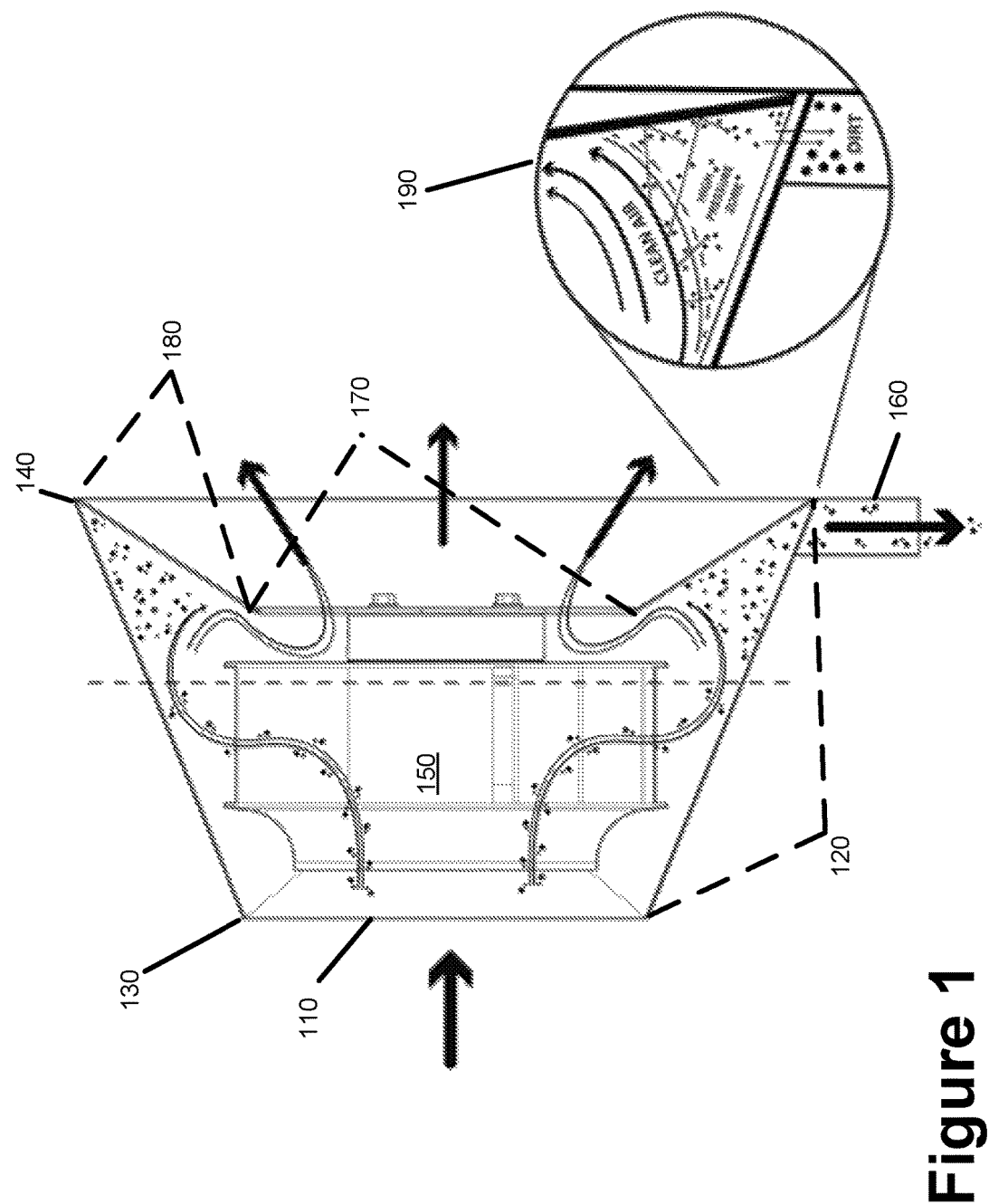
FIG. 1 depicts the centripetal air or gas cleaning system and apparatus and its operation in accordance with some embodiments.

FIG. 1 depicts the centripetal air or gas cleaning system and apparatus and its operation in accordance with some embodiments. The system and apparatus includes (1) inlet 110, (2) housing 120, (3) impeller 150, (4) particulate outlet 160, and (5) clean air outlet 170. The size of these various components 110, 120, 150, 160, and 170 will vary depending on the application of the apparatus.

Figure 2:
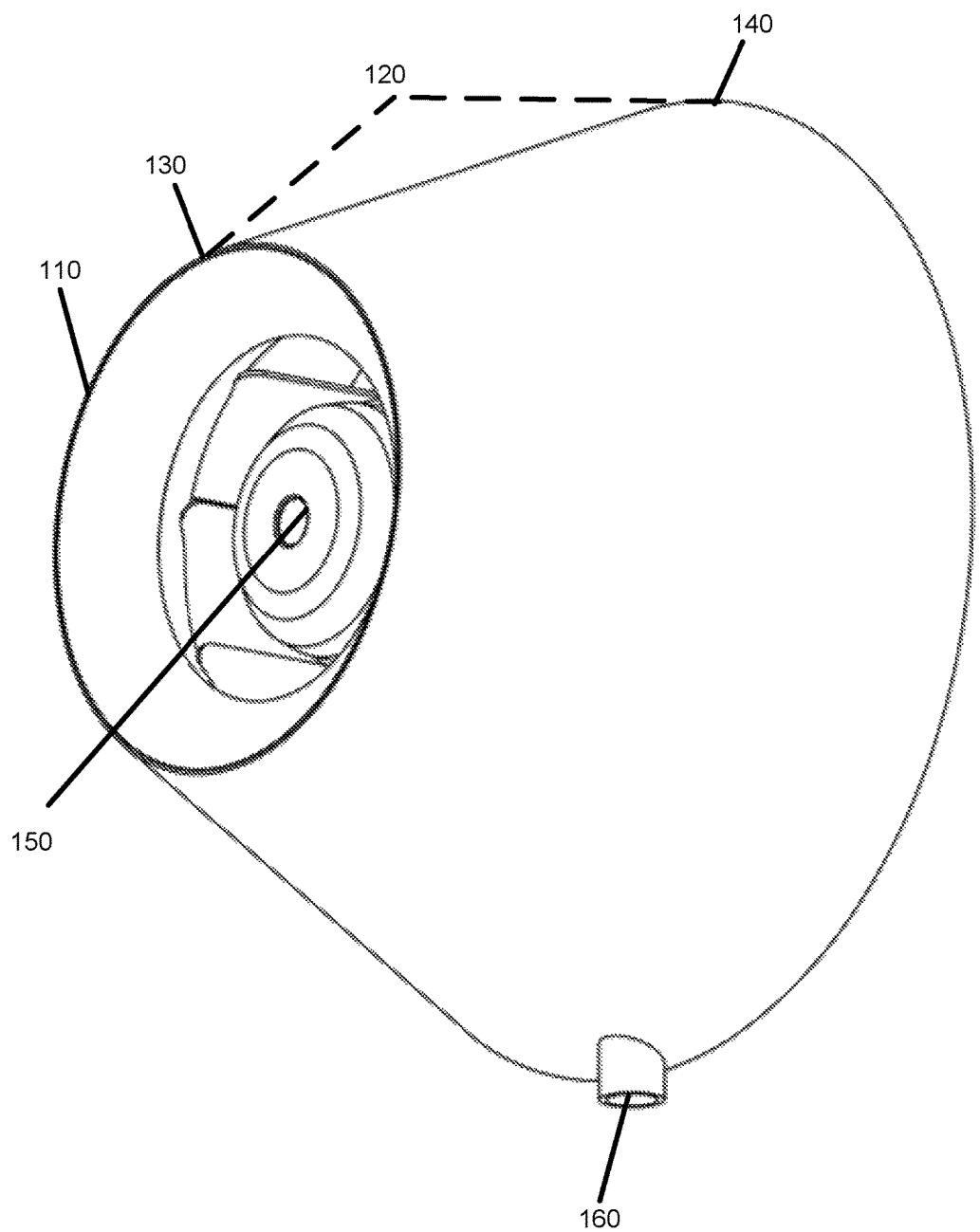
FIG. 2 presents a front perspective view of the system and apparatus.
Figure 3:
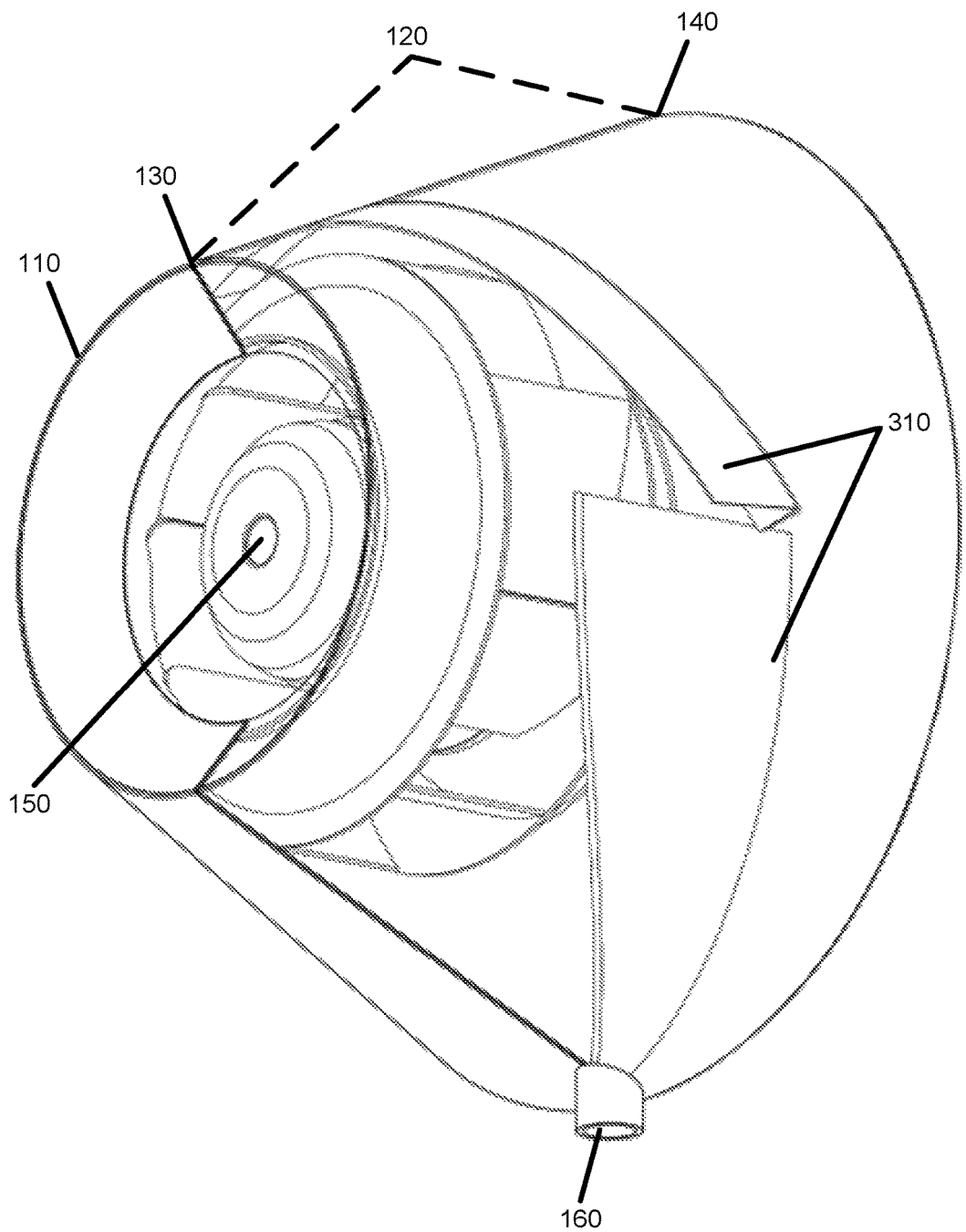
FIG. 3 presents a cut-away front perspective view of the system and apparatus.
Figure 4:
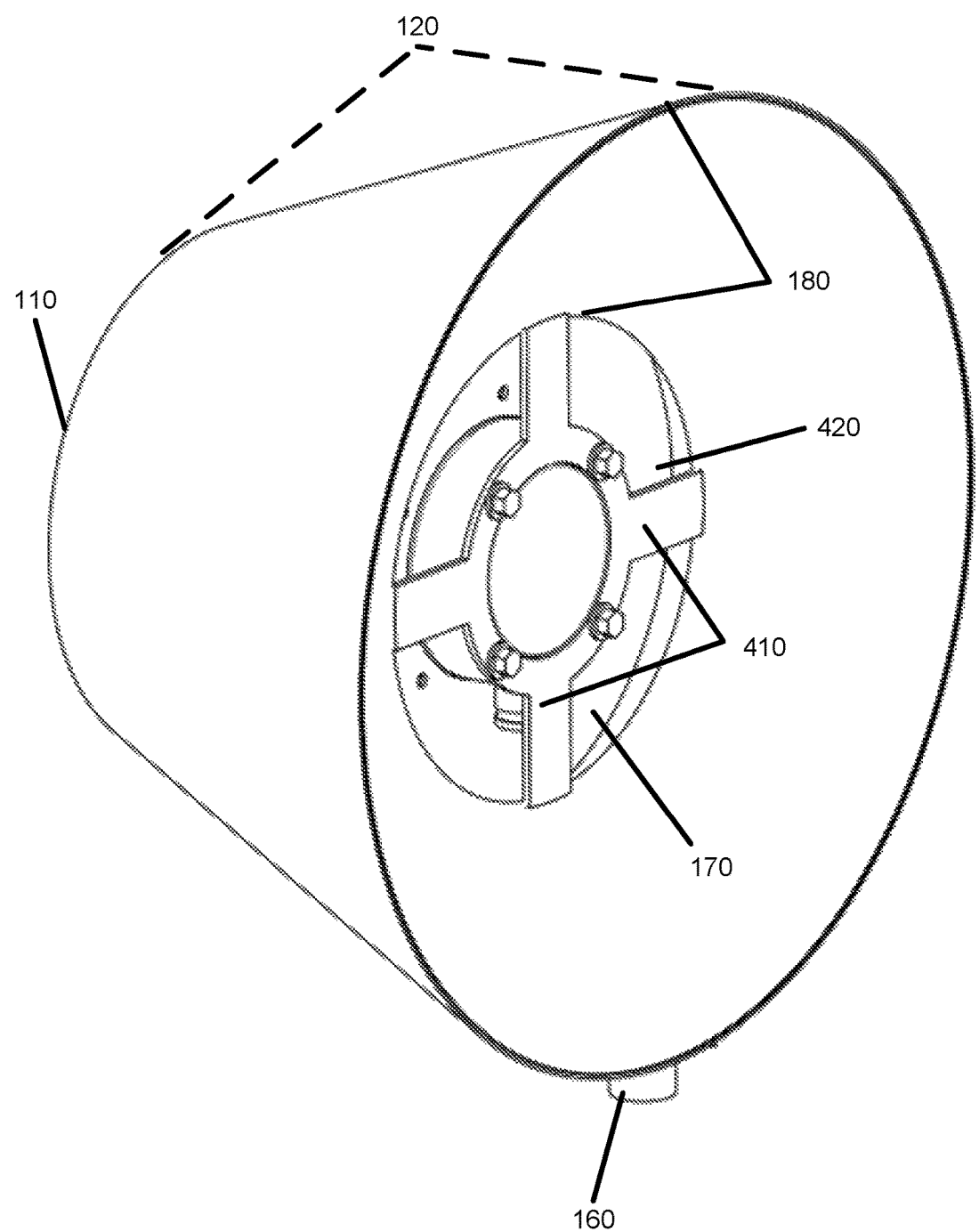
FIG. 4 presents a rear perspective view of the system and apparatus.
Figure 5:
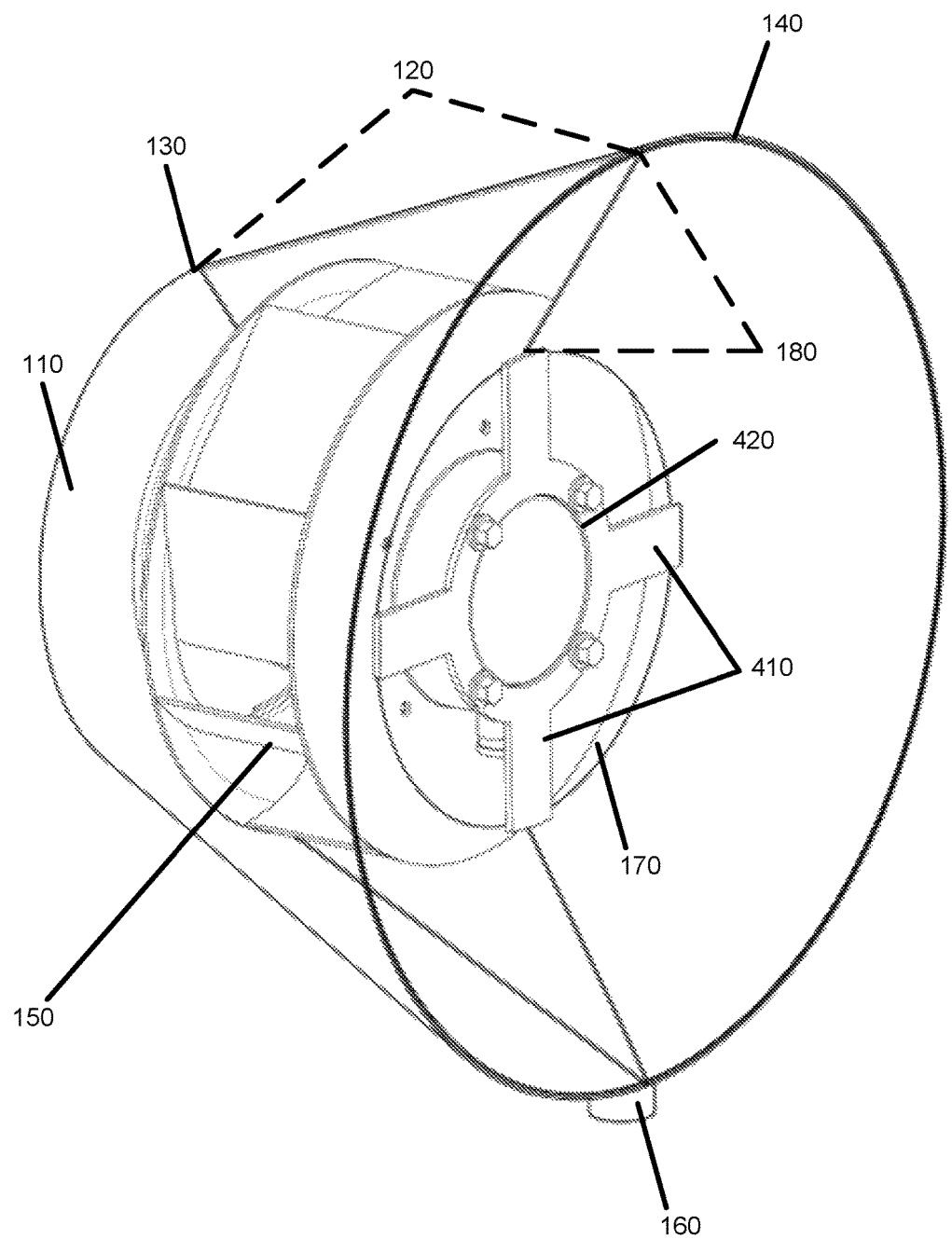
FIG. 5 presents a rear cut-away perspective view of the system and apparatus.
Figure 6:
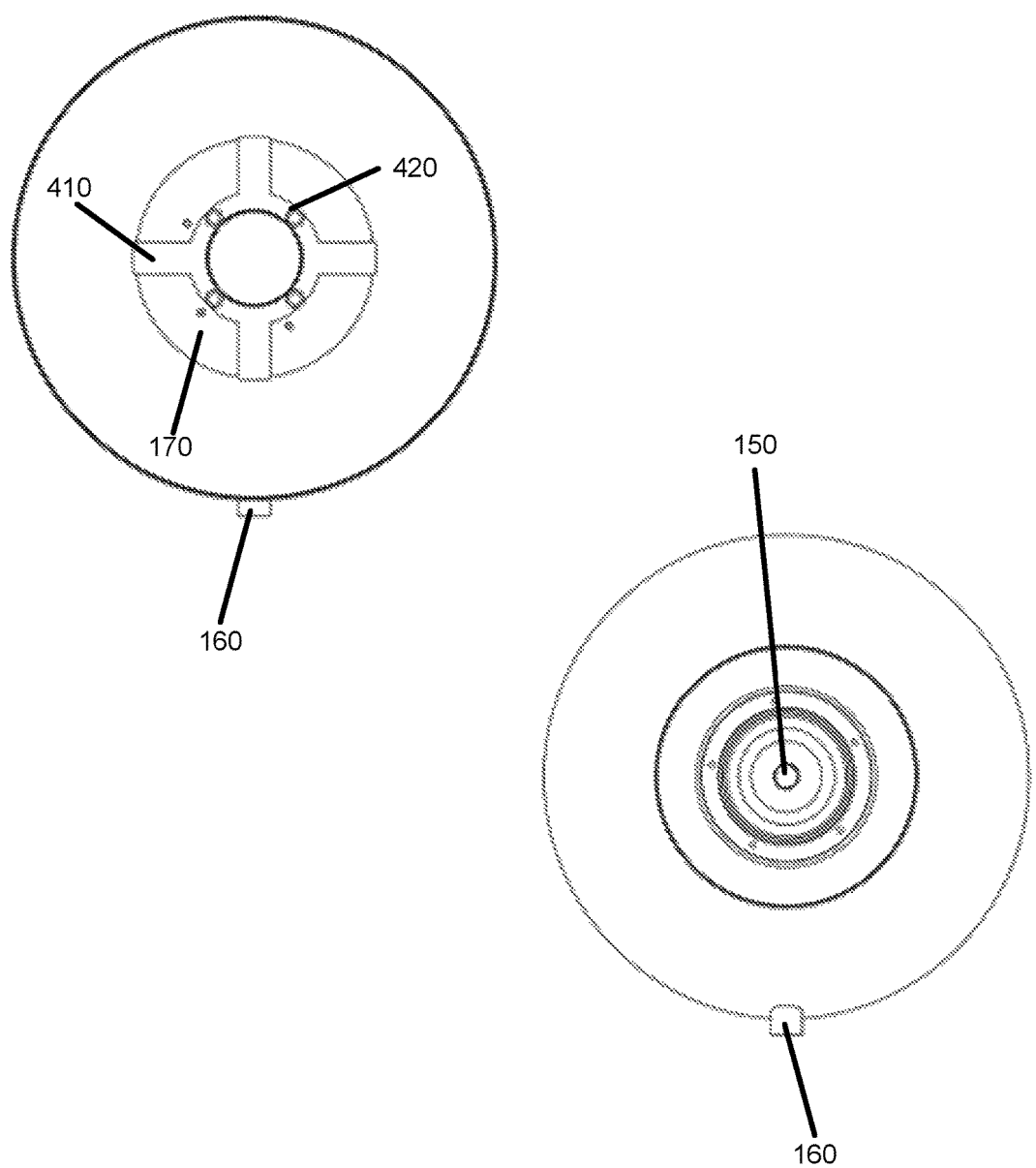
FIG. 6 presents rear and front views of the system and apparatus.
Figure 7:
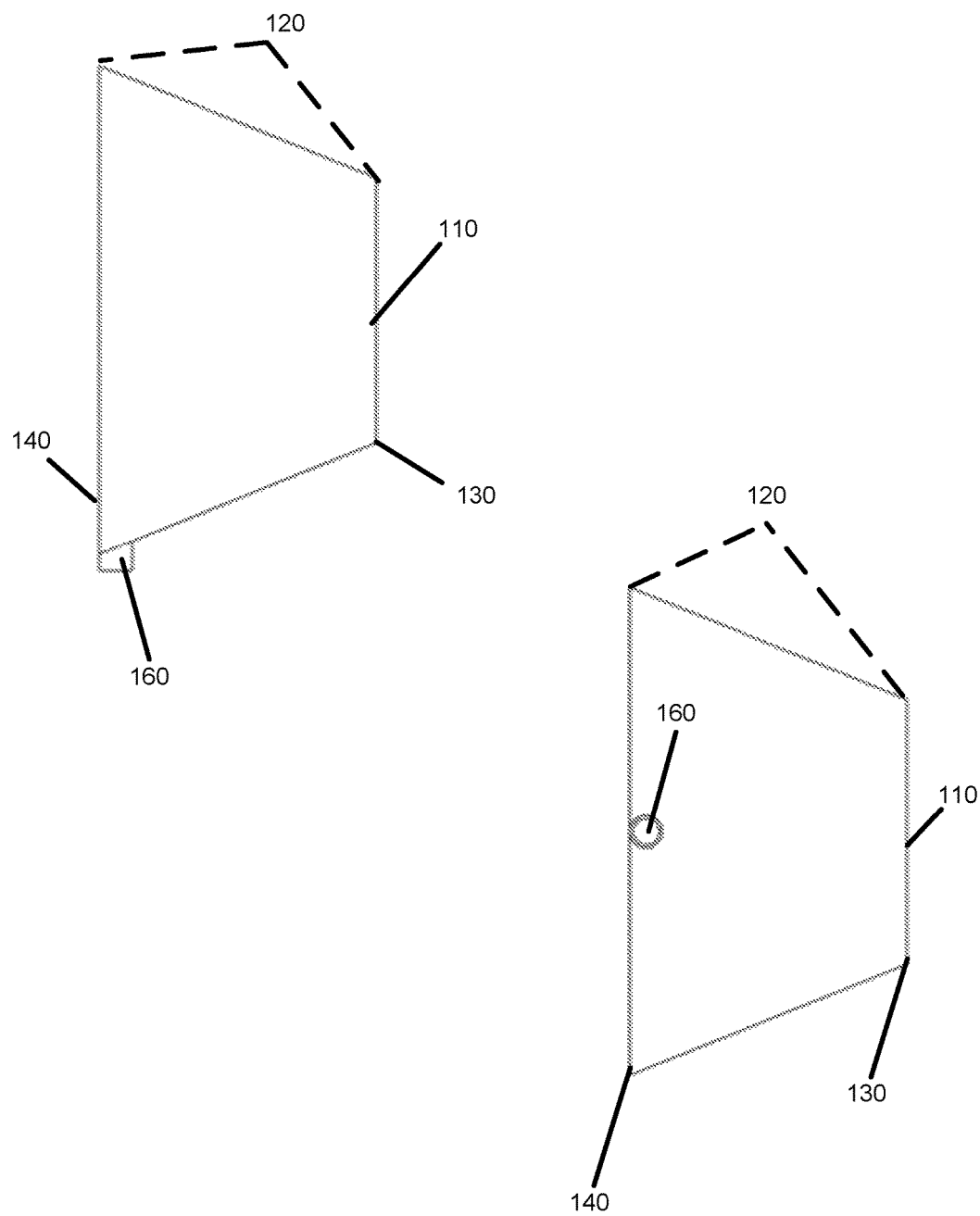
FIG. 7 presents side and bottom views of the system and apparatus.

Additional views of the apparatus as well as its components are presented in FIGS. 2-6. Specifically, FIG. 2 presents a front perspective view of the system and apparatus; FIG. 3 presents a cut-away front perspective view of the system and apparatus; FIG. 4 presents a rear perspective view of the system and apparatus; FIG. 5 presents a rear cut-away perspective view of the system and apparatus; FIG. 6 presents rear and front views of the system and apparatus; and FIG. 7 presents side and bottom views of the system and apparatus.

As shown from the various figures, the inlet 110 is an opening through which the apparatus intakes particulate-pervaded air or gas into the housing 120. The inlet 110 can be conical, circular, or any other regular or irregular shape. The various shapes of the inlet 110 allow it to couple to standard and non-standard ducts of varying sizes and thus funnel particulate-pervaded air or gas from different machines into the housing 120. The inlet 110 can be left exposed in order to intake air or gas from the surrounding environment. The inlet 110 can be constructed of any rigid or supported material such as steel, aluminum, sheet metal, plastic, etc. The diameter of the inlet 110 varies depending on the application of the apparatus. Accordingly, the inlet 110 can have a diameter less than an inch for cleaning small volumes of air or gas to far larger diameters for cleaning large volumes of air or gas. In some embodiments, the inlet 110 is an opening at the proximal end 130 of the housing 120. In some other embodiments, the housing proximal end 130 includes a ring that curves into the inlet 110 in order to join the two.

The housing 120 may be one unitary structure or separate structures that are affixed to one another. The structure(s) can be composed of steel, aluminum, sheet metal, plastic, or other rigid or supported materials. In preferred embodiments, the housing 120 is conical with the angle of the conical extension varying depending on the embodiment. In one such embodiment, the housing 120 extends from the proximal end 130 to the distal end 140 at an angle that mimics the contour of the front face of the impeller 150. In some other embodiments, the housing 120 may include a front section and a different shaped rear section. For example, the front and rear sections may be conical albeit with different angles of extensions. As another example, the front section may be conical and the rear section may be cylindrical. The specific dimensions and other characteristics of the housing 120 are determined based on the application of the apparatus. For large scale applications where a larger quantity of air or gas is to be cleaned, the housing 120 and other components of the apparatus will be larger. Conversely, for small scale applications where a smaller quantity of air or gas is to be cleaned, the housing 120 and other components of the apparatus will be smaller.

The housing 120 provides a radially collapsing volume that increases pressure for air or gas circulating therein. The radially collapsing volume is produced in part by a conical surface 180 that juts inward from the distal end 140 of the housing 120. The conical surface 180 is best viewed from the rear perspective view of FIG. 4 and rear cut-away perspective view of FIG. 5.

As illustrated, the conical surface 180 has a first edge that forms within the distal end 140 of the housing 120, wherein the diameter of the first edge matches approximately to that of the housing 120 distal end 140. A curved plane then extends inwards within the housing from this first edge at an acute angle to a second edge that is located about centrally within the housing. The angle can vary from more than 0 to less than 90 degrees in different embodiments, such that the diameter of the conical surface gradually decreases from the first edge to the second edge. A shallower angle may improve particulate separation, though the optimal angle depends on the particulate being separated. Some embodiments allow for the adjustment of the angle at which the conical surface 180 protrudes from the distal end 140 of the housing 120. Alternatively, different embodiments may each provide a different the angle at which the conical surface 180 protrudes within the housing 120.

The second edge, which is the innermost protruding edge of the conical surface 180, also contains an opening at its center. This opening is the clean air outlet 170 or is at least aligned with the clean air outlet 170. In some embodiments, the clean air outlet 170 is inline or parallel with the inlet 110. Some embodiments provide various attachments or rings to attach to the clean air outlet 170. These attachments can be used to customize the design to specific environments and applications. These attachments can also be used to directly feed the resulting cleaned air or gas into another machine or ductwork. It should be apparent that the apparatus may stand alone such that it is not connected to another device. Rather, the apparatus receives air or gas directly from the environment or feeds the cleaned air or gas into the environment.

In some embodiments, the conical surface 180 provides a mount for the impeller 150. The mount is best viewed from FIG. 4 and FIG. 5. As shown, the mount is comprised of a set of supports 410 that are affixed about the protruding second edge of the conical surface 180. Each support of the set of supports 410 may be a metallic bracket or other rigid structure. The set of supports 410 can be affixed along the circumference of the conical surface 180 protruding second edge or attached along the circumference in some similar fashion. The set of supports 410 are joined together by a circular ring 420. The circular ring 420 is the base over which the impeller 150 mounts. The impeller 150 may be mounted using a nut and bolt assembly. However, it should be apparent that other assemblies may be used to couple the impeller 150 to the mount. This mount provides a central position within the housing 120 without obscuring the clean air outlet 170 and without restricting flow by any significant quantity.

The housing 120 also contains the particulate outlet 160. The particulate outlet 160 is the opening through which the particulates that are separated from the air or gas are ejected from the apparatus. The particulate outlet 160 is located along the housing 120 distal end 140 adjacent to the base of the conical surface 180. In some embodiments, the particulate outlet 160 is optionally connected to a hose or tube that leads the particulates to a desired receptacle or some distance away from the apparatus. Some embodiments provide multiple particulate outlets adjacent to the base of the conical surface 180.

The impeller 150 is disposed within the housing 120 by coupling it to the mount found on the conical surface 180. This disposes the impeller 150 about centrally within the housing 120 and about parallel with the inlet 110 and the clean air outlet 170. A distance separates the impeller 150 from the clean air outlet 170 and provides the necessary volume for the centripetal forces described below. The impeller 150 may be a centrifugal fan or a mixed-flow impeller and may be backwardly inclined. Generally however, the impeller 150 is a rotor with a set of rotating blades. In some embodiments, the impeller 150 includes an integral motor such that all of its components are housed within housing 120. In some other embodiments, the motor for the impeller 150 is outside the housing 120. The size and dimensions of the impeller 150 can change depending on the application of the apparatus and the size of the housing 120. For each such application, dimensional analysis and computational fluid dynamics (CFD) simulations can be used to determine the optimal impeller 150 and housing 120 size. In some embodiments, multiple impellers may be mounted in parallel within the housing 120.

When in operation, the impeller 150 rotates. This rotation creates negative pressure that pulls in the particulate-pervaded air or gas from the inlet 110 into the housing 120. The inlet 110 can be exposed to directly intake air or gas from the surrounding environment or can be coupled via ducting to another machine that ejects the particulate-pervaded air or gas. The impeller 150 rotation also creates an initial accelerating force within the housing 120 that throws the drawn in particulate-pervaded air or gas towards the housing's 120 walls before the particular-pervaded air or gas can reach the distal end of the housing 120. The particulate-pervaded air or gas then decelerates due to shearing forces from the walls. As a result, a high-pressure zone forms along the base of the conical surface 180 in the collapsing volume behind where the particulate-pervaded air or gas contacts the housing's walls. A close-up conceptual view of the high-pressure zone is shown in FIG. 1 with reference to marker 190. The particulates, because of their greater momentum, penetrate through the high-pressure zone, thereby separating from the air or gas, which because of lesser inertia, is unable to penetrate through the high-pressure zone. The higher mass moment of inertia causes the particulates to move radially outward through the pressure gradients and down along the sides of the conical surface 180 until they are ejected through one of the particulate outlets 160. The air or gas, having less inertia, is deflected away from the high-pressure zone. A centripetal force then drives the particulate free air or gas behind the impeller 150 and towards the center axis. The conical surface 180 insures a smooth airflow within the housing 120, such that turbulence is minimized and air flow is not obstructed or otherwise reduced. The conical surface 180 also reduces the volume into which the cleansed air or gas is drawn as a result of centripetal force. This reduction in volume increases the angular acceleration for the cleansed air or gas and facilitates a final stage of centrifugal filtration. This final stage of filtration is aided by the impeller 150. In some embodiments, the impeller has a rear flat face. Therefore, as the air or gas amasses behind impeller from the housing 120 walls, the air or gas is subjected to a final spin before it is ejected through the clean air outlet 170. In so doing, remaining particles in the cleansed air or gas are thrown back away from the clean air outlet 170 for ejection through the particulate outlet 160.

In some embodiments, the addition of one or more channels within housing 120 can expedite the rejection of the particles, causing less angular rotation, and allowing the air to flow more efficiently towards the exit. An example of the channel can be seen with reference to marker 310 in FIG. 3. The channeling provides a discrete barrier that isolates particulates that have concentrated along the housing wall from the clean air or gas being ejected through the clean air or gas outlet.

Advantages of the disclosed apparatus over other air or gas cleaning or filtration systems of the prior art stem from the design and geometry described above. This design allows the apparatus to maintain air pressure and airflow that is more similar to ordinary, non-filtering, in-line, and enclosed ventilation fans. In other words, this system and apparatus does not suffer from as significant a drop in flow rate as do other air filtration systems. Additionally, the configuration can be modified to include additional methods of filtration to the rear of the impeller 150, such as a paddlewheel or a filter media that would self-clean as dirt would be spun out of it. Moreover, the design lends itself to moving larger quantities of air or gas without losing filtration efficiency. The design also allows for high pressurizations at the clean air outlet 170, whereas designs of the prior art cater more towards being a source for clean air to be drawn through by additional air moving devices.

We claim:

1. An air or gas cleaning apparatus comprising:
a housing comprising (i) an internal cavity enclosed by a rounded wall, (ii) an intake receiving particulate-pervaded air or gas into the internal cavity, (iii) a particulate outlet providing an aperture from which particulates separated from the particulate-pervaded air or gas exit the housing, and (iv) a cleaned air or gas outlet providing an aperture from which air or gas separated from the particulate-pervaded air or gas exit the housing;
a powered impeller positioned behind the intake about centrally within the housing, the powered impeller having an axis of rotation aligned with the intake, the powered impeller inducing suction of the particulate-pervaded air or gas at the intake and accelerating the particulate-pervaded air or gas within the internal cavity about radially to the intake;

a set of supports onto which the powered impeller mounts, said set of supports suspending the powered impeller about centrally within the internal cavity;

a motor powering the powered impeller coupled, in conjunction with the powered impeller, to the set of supports; and a surface directly extending at an acute angle from the rounded wall over an opening of the particulate outlet within said housing and towards the powered impeller, said surface trapping and guiding particulates from the particulate-pervaded air or gas to the particulate outlet based on said accelerating, whereas cleaned air or gas, having less momentum than the particulates, separates from the particulates and moves towards the cleaned air or gas outlet based on said accelerating.

2. The air or gas cleaning apparatus of claim 1, wherein the surface in combination with said accelerating creates a high-pressure zone around an inside surface of the internal cavity into which the particulates, having greater momentum than the cleaned air or gas, penetrate, but the cleaned air or gas, having less momentum than the particulates, cannot penetrate thereby separating from the particulates and exiting the housing through the cleaned air or gas outlet.

3. The air or gas cleaning apparatus of claim 1, wherein said surface comprises a channel in alignment with or leading to the particulate outlet, said channel directing the particulates towards the particulate outlet.

4. The air or gas cleaning apparatus of claim 1 further comprising an unobstructed opening in the internal cavity between the surface and the impeller through which the cleaned air or gas separating from the particulate-pervaded air or gas passes by the particulate outlet towards the cleaned air or gas outlet.

5. The air or gas cleaning apparatus of claim 4, wherein said unobstructed opening is aligned with the cleaned air or gas outlet.

6. An apparatus for removing particulates from particulate-pervaded air or gas, the apparatus comprising:

a housing comprising a front face at a proximal end, a set of supports at a distal end, a set of sidewalls connecting to the front face, an internal cavity between the set of sidewalls, a first opening providing an inlet for the particulate-pervaded air or gas into the internal cavity, a second opening dispensing particulates from the particulate-pervaded air or gas within the internal cavity, and a third opening from which cleaned air or gas exits the housing;

a powered impeller disposed within the internal cavity behind the first opening by the set of supports, the impeller is a centrifugal air or gas accelerator accelerating the particulate-pervaded air or gas towards an interior side of the set of sidewalls;

a motor powering the powered impeller coupled, in conjunction with the powered impeller, to the set of supports; and a channel comprising a discrete barrier that directly extends at an acute angle from the set of sidewalls over an opening of the second opening within an interior of the housing and towards the powered impeller.

7. The apparatus of claim 6 further comprising an unobstructed opening between the channel and the impeller.

8. The apparatus of claim 7, wherein the unobstructed opening provides an open area towards a rear of the housing through which the cleaned air or gas passes to the third opening or out the apparatus.

9. The apparatus of claim 6, wherein the powered impeller has a radius equal to or greater than a radius of the first opening and the third opening.

10. The apparatus of claim 6, wherein the particulates comprise at least one of coal dust, saw dust, metal dust, dirt, sand, and liquid suspended in air or gas.

11. The apparatus of claim 6, wherein the first opening is exposed to a surrounding environment comprising the particulate-pervaded air or gas.

12. The apparatus of claim 6, wherein the first opening is coupled to a duct funneling the particulate-pervaded air or gas from another machine.

13. The apparatus of claim 6, wherein said apparatus is made of steel, aluminum, other metal, or plastic.

14. The apparatus of claim 6, wherein the second opening comprises a spout or a coupling to a receptacle retaining the particulates ejected from the apparatus.

15. The apparatus of claim 6 further comprising a channel into which the particulates accumulate when separated from the particulate-pervaded air or gas.

16. An air or gas cleaning apparatus comprising:

housing comprising an intake receiving particulate-pervaded air or gas;

a powered impeller positioned behind the housing in alignment with the intake, the powered impeller inducing suction of the particulate-pervaded air or gas at the intake and accelerating the particulate-pervaded air or gas about radially within the housing;

a set of supports onto which the powered impeller mounts, said set of supports suspending the powered impeller about centrally within the housing;

a motor powering the powered impeller coupled, in conjunction with the powered impeller, to the set of supports; and a particulate outlet comprising an opening disposed about a particular side of the housing;

a cleaned air or gas outlet; and a surface directly extending at an acute angle from the particular side of the housing, adjacent to and over an opening of the particulate outlet within the housing towards the powered impeller, wherein the accelerating of the particulate-pervaded air or gas by the powered impeller pushes heavier particulates towards the housing sides with the surface deflecting the heavier particulates out the particulate outlet, while cleaned air or gas, having less momentum than the heavier particulates, moves away from the heavier particulates and around said surface before exiting out the cleaned air or gas outlet.

* * * * *

UNITED STATES PATENT AND TRADEMARK OFFICE
CERTIFICATE OF CORRECTION

PATENT NO. : 10,118,115 B2
APPLICATION NO. : 15/019507
DATED : November 6, 2018
INVENTOR(S) : Edward Roston, Andrew W. Lynch and Johnathan B. Wetjen Page 1 of 1

It is certified that error appears in the above-identified patent and that said Letters Patent is hereby corrected as shown below:

\*\*In Claim 1 on Column 7, Line 8, please replace "rounded wall over an opening of the" with --rounded wall over the aperture of the--

\*\*In Claim 15 on Column 8, Line 26, please replace "The apparatus of claim 6 further comprising a channel" with --The apparatus of claim 6 further comprising a second channel--

\*\*In Claim 16 on Column 8, Line 30, please replace "housing comprising an intake" with --a housing comprising an intake--

Signed and Sealed this
Fourteenth Day of May, 2019

Andrei Iancu
*Director of the United States Patent and Trademark Office*